United States Patent [19]

Ito et al.

[11] Patent Number: 4,983,656
[45] Date of Patent: Jan. 8, 1991

[54] AQUEOUS PRESSURE-SENSITIVE ADHESIVE

[75] Inventors: Toshiyuki Ito; Yorinobu Ikeda; Yasuhisa Watanabe; Hiroshi Tadenuma, all of Yokkaichi, Japan

[73] Assignee: Japan Synthetic Rubber Co., Ltd., Tokyo, Japan

[21] Appl. No.: 321,877

[22] Filed: Mar. 10, 1989

[30] Foreign Application Priority Data

Mar. 14, 1988 [JP] Japan ................................. 63-59594

[51] Int. Cl.$^5$ .............................................. C08K 5/15
[52] U.S. Cl. ..................... 524/109; 524/114; 524/145; 524/148; 524/710; 524/833
[58] Field of Search ............... 524/114, 152, 556, 833, 524/710, 114, 145, 148, 833, 109, 710

[56] References Cited

U.S. PATENT DOCUMENTS

| | | | |
|---|---|---|---|
| 4,540,739 | 9/1985 | Midgely | 524/823 |
| 4,600,754 | 7/1986 | Winner | 525/523 |

FOREIGN PATENT DOCUMENTS

| | | | |
|---|---|---|---|
| 49-93460 | 9/1974 | Japan | 524/114 |
| 51-200530 | 9/1974 | Japan | 524/152 |
| 2112603 | 5/1987 | Japan | 524/710 |
| 63-867770 | 4/1988 | Japan | 524/823 |
| 0848350 | 9/1960 | United Kingdom | 524/114 |

Primary Examiner—Joseph L. Schofer
Assistant Examiner—R. H. Delmendo
Attorney, Agent, or Firm—Oblon, Spivak, McClelland, Maier & Neustadt

[57] ABSTRACT

An aqueous pressure-sensitive adhesive consisting essentially of (1) 100 parts by weight (in terms of solids content) of an aqueous copolymer emulsion obtained by emulsion-polymerizing a monomer mixture consisting of 70–99.9% by weight of at least one alkyl (meth)acrylate in which the alkyl group has 4–12 carbon atoms, 0.1–10% by weight of an $\alpha,\beta$-unsaturated carboxylic acid and 0–29.9% by weight of a monomer copolymerizable therewith, (2) 0.1–10 parts by weight of a phosphoric acid ester compound, and (3) a polyglycidyl compound in such an amount that the proportion of the epoxy group in the polyglycidly compound is 0.1–3 equivalents per equivalent of the carboxyl group in the aqueous copolymer. This aqueous pressure-sensitive adhesive has excellent balance in adhesion to adherend, peelability from adherend and anchoring to substrate; and the peelability from adherend is not varied depending upon the type of adherend and does not change with time or by heating.

13 Claims, No Drawings

AQUEOUS PRESSURE-SENSITIVE ADHESIVE

BACKGROUND OF THE INVENTION

This invention relates to an aqueous pressure-sensitive adhesive for use in adhesive tapes, labels, sheets, etc. (hereinafter these are collectively referred to as tapes).

In recent years, plastic products have become used widely and, for indicating their trademarks, prices, etc. thereon or for packaging or binding them, adhesive tapes using a pressure-sensitive adhesive are used. These tapes are usually removed when the plastic products are actually used. In the conventional pressure-sensitive adhesives, adhesion to adherend has been considered important, so that the adhesion to adherend has been so strong that when the tapes were removed from the adherend paper-breaking, adhesive-remaining on adherend, etc. tend to occur at the time of tape removal, resulting in staining of plastic product and significant deterioration of commercial value of plastic product. There are also pressure-sensitive adhesives which are generally called "peelable type" or "weak adhesion type" and which do not cause the paper-breaking or the adhesive-remaining on adherend; however, those of prior art remain as slight blur on adherend after the tapes using the adhesives have been removed. Pressure-sensitive adhesives remaining on adherend can be removed with a solvent or by mechanical rubbing when the adherend are metal or glass products; however, when the adherend is a plastic product, the surface of plastic product is sometimes attacked by the solvent or damaged by the mechanical rubbing, resulting in a significant deterioration of appearance or commercial value of plastic product at the time of its actual use.

The tapes are usually produced by coating a pressure-sensitive adhesive on a peeling paper, drying the adhesive-coated paper and transferring the adhesive onto a substrate such as paper, cloth, plastic film or the like. In the thus produced tapes, when the anchoring of the pressure-sensitive adhesive to the substrate (the paper) is poor, the pressure-sensitive adhesive is not peeled off from an adherend and only the substrate is peeled off when the tape is peeled off from the adherend, which eventually causes the adhesive-remaining on adherend. When the adhesion of the pressure-sensitive adhesive to the adherend is reduced in order to increase the peelability of the pressure-sensitive adhesive from the adherend, the anchoring of the pressure-sensitive adhesive to the substrate inevitably becomes poor and the same problem as mentioned above arises. Moreover, the peelability of a pressure-sensitive adhesive from an adherend decreases with time or with change in environmental conditions (e.g. heating) after the sticking of the tape on the adherend and also that the peelability depends on the type of the adherend. Thus, pressure-sensitive adhesives are required to be well balanced in adhesion to adherend, peelability from adherend and anchoring to substrate. Further, the peelability from adherend is required not to be influenced by the type of adherend and not to be reduced with time or with change in environmental conditions after sticking of tape on adherend. It is also required to be such that no blur on adherend is caused after the tape has been peeled off from the adherend. The conventional pressure-sensitive adhesives are far from satisfactory from these requirements.

In pressure-sensitive adhesives, the main component polymer is used generally in solution. For example, a polymer solution obtained by solution polymerization is used as such, or a polymer solution obtained by dissolving the formed polymer in a solvent is used. However, pressure-sensitive adhesives containing such a polymer solution have had problems such as toxicity, fire outbreak, environmental pollution and the like because the solvent contained in the polymer solution is removed by evaporation in the course of production of tapes from the adhesives.

Aqueous pressure-sensitive adhesives are known as an adhesive replacing the above solution type pressure-sensitive adhesives. As the aqueous pressure-sensitive adhesives, there are known, for example, an adhesive composition obtained by compounding a polyglycidylamine as a crosslinking agent with a carboxyl group-containing polymer (Japanese Patent Application Kokoku No. 57,509/82), an amino group-containing polymer obtained by using a specific functional monomer (Japanese Patent Application Kokai No. 93,460/74), an amino group-containing polymer obtained by using a tert-amino group-containing ethylenically unsaturated compound (Japanese Patent Application Kokai No. 134,032/75); an adhesive composition obtained by compounding an epoxy compound with a functional group-containing conjugated diene polymer (Japanese Patent Application Kokai No. 10,228/74); an adhesive composition obtained by compounding a water-soluble, high molecular weight substance and an epoxy compound with a carboxyl group-containing polymer (Japanese Patent Application Kokai No. 93,446/74); an adhesive composition obtained by compounding a phosphorous acid ester with an adhesive resin (Japanese Patent Application Kokai No. 243,669/87); and an adhesive composition obtained by compounding an amphoteric surfactant and a plasticizer with a copolymer emulsion (Japanese Patent Application Kokoku No. 47,463/87). These conventional pressure-sensitive adhesives of the solution type or the aqueous type do not satisfy the requirements that the pressure-sensitive adhesive is well balanced in the above-mentioned properties necessary for pressure-sensitive adhesive. Some of these conventional adhesives are fairly well balanced in said properties but they are such that blur remains on an adherend after the tapes having them are stuck on the adherend and then peeled off. Thus, a development of an improved aqueous pressure-sensitive adhesive has been desired.

Under such circumstances, the present inventors previously proposed, as an aqueous pressure-sensitive adhesive satisfying the requirements for pressure-sensitive adhesives, an adhesive composition obtained by compounding a polyglycidyl compound with a specific copolymer (Japanese Patent Application Kokai No. 86,777/88).

SUMMARY OF THE INVENTION

This invention aims at providing an aqueous pressure-sensitive adhesive satisfying all the requirements that the adhesion to adherend is good, the peelability from adherend is good, the anchoring to substrate is good, the peelability from adherend is not influenced by the type of adherend nor reduced with time or with change in environmental conditions after the tape having the adhesive has been stuck on an adherend, and blur does not remain on an adherend after the tape having the adhesive stuck on an adherend has been peeled off.

It has been found that the above object can be achieved by compounding specific amounts of a phosphoric acid ester compound and a polyglycidyl compound with an aqueous copolymer emulsion obtained by emulsion-polymerizing a specific monomer mixture.

According to this invention, there is provided an aqueous pressure-sensitive adhesive consisting essentially of (1) 100 parts by weight (in terms of solids content) of an aqueous copolymer emulsion obtained by emulsion-polymerizing a monomer mixture consisting of 70–99.9% by weight of at least one alkyl (meth)acrylate in which the alkyl group has 4–12 carbon atoms, 0.1–10% by weight of an $\alpha,\beta$-unsaturated carboxylic acid and 0–29.9% by weight of a monomer copolymerizable therewith, (2) 0.1–10 parts by weight of a phosphoric acid ester compound, and (3) a polyglycidyl compound in such an amount that the proportion of the epoxy group contained in the polyglycidyl compound is 0.1–3 equivalents per equivalent of the carboxyl group in the aqueous copolymer.

DESCRIPTION OF PREFERRED EMBODIMENT OF THE INVENTION

The alkyl acrylate in which the alkyl group has 4–12 carbon atoms used in this invention includes specifically, butyl acrylate, 2-ethylhexyl acrylate, n-octyl acrylate, isononyl acrylate and lauryl acrylate. The alkyl methacrylate in which the alkyl group has 4–12 carbon atoms includes specifically butyl methacrylate, 2-ethylhexyl methacrylate, n-octyl methacrylate, isononyl methacrylate and lauryl methacrylate. These alkyl acrylates and methacrylates can be used alone or in admixture of two or more. Particularly preferable are butyl acrylate, 2-ethylhexyl acrylate, isononyl acrylate and lauryl methacrylate.

In this invention, the number of carbon atoms of the alkyl group of the alkyl (meth)acrylate is critical. When the number of carbon atoms is outside the above range, it is impossible to achieve the object of the present invention.

The amount of the alkyl acrylate and/or the alkyl methacrylate in which the alkyl group has 4–12 carbon atoms is 70–99.9% by weight, preferably 75–98% by weight, based on the weight of the monomer mixture. When the amount is less than 70% by weight, the resulting adhesive has so strong adhesion to adherends as to cause staining of adherend due to paper-breaking. Also, when the amount is more than 99.9% by weight, the resulting adhesive has so strong adhesion to adherends as to cause the same staining of adherend as above.

The $\alpha,\beta$-unsaturated carboxylic acid used in this invention includes specifically acrylic acid, methacrylic acid, itaconic acid, maleic acid and fumaric acid. These $\alpha,\beta$-unsaturated carboxylic acids can be used alone or in admixture of two or more. Particularly preferable are acrylic acid and methacrylic acid.

The amount of the $\alpha,\beta$-unsaturated carboxylic acid used is 0.1–10% by weight, preferably 0.3–5% by weight, based on the weight of the monomer mixture. When the amount is outside the above range, the resulting adhesive has so strong adhesion to adherends as to cause paper-breaking or adhesive-remaining on adherend.

The monomer copolymerizable with the alkyl (meth)acrylates and the $\alpha,\beta$-unsaturated carboxylic acid includes alkyl (meth)acrylates in which the alkyl group has 3 or less carbon atoms such as methyl acrylate, methyl methacrylate, ethyl acrylate, ethyl methacrylate, isopropyl acrylate, isopropyl methacrylate and the like; hydroxyalkyl (meth)acrylates such as hydroxyethyl acrylate, hydroxyethyl methacrylate and the like; alkoxyalkyl (meth)acrylates such as methoxyethyl acrylate, ethoxymethyl acrylate and the like; glycidyl (meth)acrylate; $\alpha,\beta$-unsaturated nitriles such as acrylonitrile, methacrylonitrile and the like; N-substituted or unsubstituted amides of (meth)acrylic acid such as acrylamide, methacrylamide, N-methylolacrylamide, N-methoxymethylacrylamide, N-methoxybutylacrylamide and the like; ethylenically unsaturated aromatic hydrocarbons such as styrene, $\alpha$-methylstyrene and the like; etc. Of these, particularly preferable are methyl methacrylate, acrylonitrile and N-methylolacrylamide.

The amount of the copolymerizable monomer when used is preferably 0.1 to 5% by weight based on the weight of the monomer mixture.

The aqueous copolymer emulsion used in this invention is prepared by emulsion-polymerizing in an aqueous medium a monomer mixture consisting of the alkyl acrylate and/or the alkyl methacrylate in which the alkyl group has 4–12 carbon atoms, the $\alpha,\beta$-unsaturated carboxylic acid and the monomer copolymerizable therewith. The emulsion polymerization method and the conditions therefor are not critical, and the polymerization can be effected by a known method under known conditions. For example, the above monomer mixture is dispersed and emulsified in water together with a cationic, anionic or nonionic surfactant as an emulsifier, such as polyethylene nonyl phenyl ether, sodium lauryl sulfate, sodium dodecylbenzenesulfonate or the like, a polymerization initiator such as persulfuric acid salt, azobisisobutyronitrile, peroxide or the like, a molecular weight modifier such as butyl mercaptan, dodecyl mercaptan, isopropyl alcohol, methanol, carbon tetrachloride or the like, and, if necessary, additives such as defoaming agent, thickener, antiseptic and the like, and then is subjected to copolymerization usually in an inert atmosphere. In this invention, the copolymer emulsion prepared by the following method (a) or (b) is used particularly preferably.

(a) A monomer mixture is dispersed and emulsified in water together with the necessary additives such as emulsifier, polymerization initiator and the like to prepare a preemulsion, and the whole of the preemulsion prepared is subjected as such to emulsion polymerization to complete the polymerization of the monomer mixture.

(b) Of the preemulsion obtained in the same manner as in (a) above, 5–50% by weight, preferably 10–30% by weight is firstly subjected to emulsion polymerization and the polymerization is continued while adding the remainder of the preemulsion continuously or intermittently to complete the polymerization of the monomer mixture.

Particularly, when the copolymer emulsion obtained by the method (b) is used, an adhesive can be obtained which is superior in adhesion to adherend, peelability from adherend and anchoring to substrate.

The copolymer obtained by emulsion-polymerizing the above monomer mixture has a glass transistion temperature (Tg) of preferably $-40°$ C. or less, more preferably $-90°$ to $-45°$ C. When the temperature is higher than $-40°$ C., the resulting adhesive has so strong adhesion to adherends as to cause paper-breaking. Incidentally, the glass transition temperature was determined by the following equation:

$$\frac{1}{Tg} = \Sigma \frac{Wi}{Tgi}$$

wherein

Tg: a glass transition temperature of a copolymer indicated by absolute temperature, Tgi: a glass transition temperature of a homopolymer of a monomer component (i) indicated by absolute temperature, and Wi: a weight fraction of a component (i) in a copolymer (J. Brandrup et al., "Polymer Hand Book", J. Wiley, 2nd ed.).

The phosphoric acid ester compound used in this invention includes phosphoric acid esters and their derivatives. The phosphoric acid ester compound includes phosphoric acid esters, alkylphenol type phosphoric acid esters, alkyl type phosphoric acid esters, monoester salts of phosphoric acid with higher alcohols, and diester salts of phosphoric acid with higher alcohols. The phosphoric acid ester compound includes commercially available phosphoric acid ester compounds such as GAFAC RM-410 (brand name of Toho Kagaku Kogyo K.K. for an alkylphenol type phosphoric acid ester), GAFAC RS-710 (brand name of Toho Kagaku Kogyo K.K. for an alkyl type phosphoric acid ester), JAS-101 (brand name of Takemoto Fat & Oil Co., Ltd. for an alkyl phosphate salt), Electrostripper K (brand name of Kao Soap Co., Ltd. for a potassium salt of an alkyl phosphate) and ELENON No. 20 (brand name of Daiichi Kogyo Seiyaku Co., Ltd. for an ester of phosphoric acid with a higher alcohol).

The amount of the phosphoric acid ester compound used is 0.1–10 parts by weight, preferably 0.2–5 parts by weight, per 100 parts by weight (in terms of solids content) of the copolymer emulsion. When the amount is less than 0.1 part by weight, the adhesion of the resulting adhesive increases with time, resulting in reduction in peelability. When the amount is more than 10 parts by weight, the adhesive remains on adherend when the tape is peeled.

The phosphoric acid ester compound can be added to the copolymer emulsion prepared or can be added as an emulsifier at the time of preparation of the copolymer emulsion.

The aqueous pressure-sensitive adhesive of this invention can be prepared by compounding the above phosphoric acid ester compound and a polyglycidyl compound with the copolymer emulsion. In this case, the polyglycidyl compound is used in such an amount that the proportion of the epoxy group thereof contained in the polyglycidyl compound is 0.1–3 equivalents, preferably 0.2–2 equivalents, per equivalent of the carboxyl group in the aqueous pressure-sensitive copolymer. The polyglycidyl compound functions as a crosslinking agent for the copolymer, and contributes to the achievement of the object of this invention. When the amount of the polyglycidyl compound used is less than 0.1 equivalent on the above basis, the resulting adhesive has so strong adhesion as to cause adhesive-remaining on adherend and staining of adherend. When the amount is more than 3 equivalents on the same basis, the resulting adhesive has poor anchoring to substrate.

The polyglycidyl compound used in this invention is a compound having at least two epoxy groups, and includes specifically ethylene glycol diglycidyl ether, polyethylene glycol diglycidyl ether, propylene glycol diglycidyl ether, polypropylene glycol diglycidyl ether, neopentyl glycol diglycidyl ether, 1,6-hexanediol diglycidyl ether, dibromoneopentyl glycol diglycidyl ether, diglycidyl o-phthalate, glycerine polyglycidyl ether, trimethylolpropane polyglycidyl ether, diglycerol polyglycidyl ether, polyglycerol polyglycidyl ether, sorbitol polyglycidyl ether and the like. Besides, there can also be used N,N,N',N'-tetraglycidyl-m-xylylenediamine, N,N,N',N',N''-pentaglycidyldiethylenetriamine, N,N,N',N'-tetraglycidylethylenediamine, etc. Of these, particularly preferable are polyglycidyl compounds having two or more epoxy groups and one or more tertiary amino groups, such as polyethylene glycol diglycidyl ether, N,N,N',N'-tetraglycidyl-m-xylylenediamine and the like.

When a glycidyl compound having one epoxy group is substituted for the polyglycidyl compound, the resulting adhesive has too strong adhesion and accordingly has poor peelability from adherend.

This invention is characterized by compounding a phosphoric acid ester compound and a polyglycidyl compound with an aqueous copolymer emulsion obtained by emulsion polymerization. The combination of the three components makes it possible to obtain a good balance of anchoring to substrate and peelability from adherend without any blur remaining on the adherend after the peeling of tape.

No peelability from adherend is obtained when only a phosphoric acid ester compound is compounded with an aqueous copolymer emulsion. In such a combination, even if peelability from adherend could be obtained, it is unavoidable that blur remains on an adherend after peeling of tape.

When only a polyglycidyl compound is compounded with an aqueous copolymer emulsion, the change of adhesion with time after the sticking of tape on adherend is unavoidable.

When a phosphoric acid ester compound and a polyglycidyl compound are compounded with a solution type pressure-sensitive adhesive composition obtained by dissolving a solid polymer in an organic solvent, it is also unavoidable that blur remains on an adherend after the peeling of tape.

In this invention, the combination of the three components has unexpectedly brought about a very favorable effect of giving an adhesion which is not varied depending upon the type of adherend. In general, the adhesion of pressure-sensitive adhesive varies depending upon the type of adherend. That is, it is strong to metals such as stainless steel and the like, while it is weak to plastics of low polarity such as polyolefin and the like. Therefore, when attention is directed to peelability as in the present invention, it follows in some cases that a tape having a pressure-sensitive adhesive adheres only weekly to a polyolefin product, and hence, peels off spontaneously owing to the weak adhesion. In the case of the pressure-sensitive adhesive of this invention, however, there is no difference between the adhesion to metal and the adhesion to polyolefin, and the adhesive is excellent in adhesion to and peelability from all adherends.

The aqueous pressure-sensitive adhesive of this invention can further comprise various additives used in conventional aqueous pressure-sensitive adhesives, such as white pigment, thickener, wetting agent, alkali, stabilizer and emulsifier.

This invention is explained in more detail below referring to Examples. In the Examples, parts and are by weight, unless otherwise specified.

EXAMPLES 1-12 and COMPARATIVE EXAMPLES 1-10

Emulsion Polymerization

Monomer mixtures having the compositions shown in Table 1 and Table 2 (except Comparative Examples 8, 9 and 11) were emulsion-polymerized according to the following methods.

Method (A)

40 parts of water and 0.1 part of ammonium persulfate as a polymerization initiator were fed to an autoclave equipped with a stirrer, a temperature controller and a reflux condenser. The mixture was heated to 70° C. Thereto were added 100 parts of the monomer mixture shown in Table 1 or 2 (except Comparative Examples 8, 9 and 11), 0.05 part of n-butyl mercaptan as a molecular weight modifier, 60 parts of water, 1.0 part of sodium dodecylbenzenesulfonate as an emulsifier and 1.0 part of polyoxyethylene nonyl phenyl ether as an emulsifier. The resulting mixture was stirred and emulsified to prepare a preemulsion.

The total amount of the preemulsion was continuously fed to an autoclave at 80° C. with stirring in 8 hours while effecting emulsion polymerization, after which the stirring was continued at 80° C. for a further 2 hours to complete the copolymerization.

Method (B)

A preemulsion was prepared in the same manner as in Method (A). A portion of the preemulsion corresponding to 10 parts of the monomer mixture used was subjected to polymerization at 70° C. After the completion of the polymerization, the system was stirred at 70° C. while continuously feeding in 7 hours the remainder of the preemulsion corresponding to 90 parts of the monomer mixture, to effect emulsion polymerization. The stirring was continued at 80° C. for a further 2 hours to complete the copolymerization.

Method (C)

A preemulsion was prepared in the same manner as in Method (A). A portion of the preemulsion corresponding to 30 parts of the monomer mixture used was subjected to polymerization at 70° C. After the completion of the polymerization, the system was stirred at 70° C. while continuously feeding in 5 hours the remainder of the preemulsion corresponding to 70 parts of the monomer mixture, to effect emulsion polymerization. The stirring was continued at 80° C. for a further 2 hours to complete the copolymerization.

The glass transition temperatures of the copolymers in the emulsions obtained in Methods (A), (B) and (C) are shown in Table 1 and Table 2 (except Comparative Examples 8, 9 and 10). These glass transition temperatures were calculated using the previously shown equation.

Incidentally, Methods (A), (B) and (C) are all embodiments of the copolymer latex preparation method (b) mentioned previously.

Preparation of aqueous pressure-sensitive adhesive

Each of the emulsions obtained by Methods (A), (B) and (C) was adjusted to pH 8.5 with ammonia. Thereto was added a polysodium acrylate [ASE-60 (brand name of Rohm and Haas] to adjust the viscosity of the emulsion as measured by a Brookfield viscometer using a No. 4 spindle at 6 rpm to $2 \times 10^4$ cP. Thereto were added a polyglycidyl compound and a phosphoric acid ester compound, both of which are shown in Table 1 and Table 2 (except Comparative Examples 8, 9 and 11), in the proportions shown in Table 1 and Table 2 (except Comparative Examples 8, 9 and 11) to prepare various aqueous pressure-sensitive adhesives.

Evaluation of aqueous pressure-sensitive adhesive

Adhesive test pieces were prepared from the aqueous pressure-sensitive adhesives prepared above. They were measured for adhesion to adherend, peelability from adherend and anchoring to substrate.

(i) Preparation of adhesive test piece

An aqueous pressure-sensitive adhesive prepared as above was coated on a peeling paper and dried. Then the adhesive was transferred onto a high-quality paper. After 7 days of aging, the high-quality paper was cut into a given size to prepare a test piece.

(ii) Measurement of adhesion

The above test piece was measured for adhesion using three adherends, i.e. a stainless steel plate, an ABS (acrylate/butadiene/styrene resin) plate and a polypropylene plate.

Stainless steel plate: The test piece was stuck on a stainless steel plate (SUS 304) and allowed to stand at 20° C. for 24 hours or at 40° C. for 7 days. Then, a peeling test was conducted according to a method specified by JIS Z 0237 to measure the adhesion of the adhesive in terms of g/25 mm.

ABS plate and polypropylene plate: An ABS plate and a polypropylene plate were washed with ethanol. The test piece was stuck on each of these plates and allowed to stand at 20° C. for 24 hours or at 40° C. for 7 days. Then, a peeling test was conducted according to a method specified by JIS Z 0237 to measure the adhesion of the adhesive in terms of g/25 mm.

It was generally preferable that the adhesion be in a range of 500–1,400 g/25 mm.

(iii) Peelability

In the above measurement of adhesion, the condition after the peeling of the test piece was observed and rated according to the following 5 levels.
A: Very good.
B: Good.
C: Paper-breaking.
D: Adhesive-remaining on adherend
E: Blur.

(iv) Ball tack

Ball tack which is one yardstick for adhesion was measured by a method specified by JIS Z 0237.

It is generally preferable that the ball tack be in a range of 8–12.

(v) Anchoring to paper

The adhesive side of the test piece was rubbed with fingers to examine whether or not the adhesive was eliminated from the paper (the substrate) by the rubbing, and the anchoring of adhesive to paper was rated according to the following two levels.

X: Adhesive is easily peeled off by rubbing the surface of adhesive with fingers.

O: Adhesive is not peeled off by rubbing the surface of adhesive with fingers.

The results of the above evaluations are shown in Table 1 and Table 2.

Incidentally, the symbols used in Table 1 and Table 2 have the following meanings:

2-EHA: 2-Ethylhexyl acrylate
INO: Isononyl acrylate
MMA: Methyl methacrylate
AN: Acrylonitrile
AC: Acrylic acid
MAC: Methacrylic acid
PEGDGE: Polyethylene glycol diglycidyl ether
GDGE: Glycerine diglycidyl ether
TG-m-XD: Tetraglycidyl-m-xylylenediamine
GAFAC RM-410 (brand name): Alkylphenol type phosphoric acid ester manufactured by Toho Kagaku Kogyo K.K.
GAFAC RS-710 (brand name): Alkyl type phosphoric acid ester manufactured by Toho Kagaku Kogyo K.K.
JAS-101 (brand name): Salt of alkyl phosphate manufactured by Takemoto Fat & Oil Co., Ltd.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polymerization method | A | A | A | A | A | A | A | A | A | A | B | C |
| Copolymer composition (parts) | | | | | | | | | | | | |
| 2-EHA | 74 | 88 | — | — | — | — | — | 88 | 88 | — | 88 | 88 |
| INO | — | — | 81 | 86 | 81 | 81 | 81 | — | — | 81 | — | — |
| MMA | 25 | 10 | — | — | — | — | — | 10 | 10 | — | 10 | 10 |
| AN | — | — | 17 | 11 | 17 | 17 | 17 | — | — | 17 | — | — |
| AC | 1 | 2 | — | — | — | — | — | 2 | 2 | — | 2 | 2 |
| MAC | — | — | 2 | 3 | 2 | 2 | 2 | — | — | 2 | — | — |
| GAFAC RM-410 | — | — | — | — | — | — | — | — | — | 2.0 | — | — |
| Copolymer's glass transition temp. (°C.) | −43 | −58 | −62 | −67 | −62 | −62 | −62 | −58 | −58 | −62 | −58 | −58 |
| Polyglycidyl compound (*1) | | | | | | | | | | | | |
| PEGDGE | 1.0 | 1.0 | — | — | — | — | — | 0.1 | 3.0 | — | — | — |
| GDGE | — | — | 1.0 | 1.0 | — | — | — | — | — | 1.0 | — | — |
| TG-m-XD | — | — | — | — | 1.0 | 1.0 | 1.0 | — | — | — | 1.0 | 1.0 |
| Phosphoric acid ester (parts) | | | | | | | | | | | | |
| GAFAC RM-410 | 2.0 | 2.0 | 2.0 | 2.0 | — | — | — | — | — | — | 2.0 | 2.0 |
| GAFAC RS-710 | — | — | — | — | 0.1 | 5.0 | 10.0 | — | — | — | — | — |
| JAS-101 | — | — | — | — | — | — | — | 2.0 | 2.0 | — | — | — |
| Adhesion (g/25 mm) (× 10$^2$) | | | | | | | | | | | | |
| After 20° C. × 24 hours | | | | | | | | | | | | |
| Stainless steel plate | 9 | 8 | 8 | 10 | 8 | 7 | 6 | 11 | 5 | 8 | 8 | 8 |
| ABS plate | 10 | 10 | 10 | 12 | 10 | 8 | 6 | 10 | 5 | 10 | 10 | 9 |
| Polypropylene plate | 9 | 9 | 9 | 11 | 9 | 8 | 6 | 10 | 5 | 9 | 9 | 8 |
| After 40° C. × 7 days | | | | | | | | | | | | |
| Stainless steel plate | 12 | 8 | 8 | 11 | 12 | 7 | 6 | 13 | 6 | 8 | 8 | 9 |
| ABS plate | 13 | 11 | 10 | 12 | 12 | 8 | 7 | 14 | 5 | 11 | 10 | 11 |
| Polypropylene plate | 12 | 9 | 9 | 11 | 11 | 8 | 6 | 13 | 9 | 9 | 9 | 9 |
| Peelability | | | | | | | | | | | | |
| After 20° C. × 24 hours | | | | | | | | | | | | |
| Stainless steel plate | A | A | A | A | A | A | A | A | A | A | A | A |
| ABS plate | A | A | A | A | A | A | A | A | A | A | A | A |
| Polypropylene plate | A | A | A | A | A | A | A | A | A | A | A | A |
| After 40° C. × 7 days | | | | | | | | | | | | |
| Stainless steel plate | B | A | A | A | B | A | B | B | B | A | A | B |
| ABS plate | B | A | A | A | B | A | B | B | B | A | A | B |
| Polypropylene plate | B | A | A | A | A | A | B | B | B | A | A | B |
| Tack (Ball No.) | 11 | 12 | 12 | 12 | 12 | 12 | 11 | 12 | 11 | 11 | 12 | 12 |
| Anchoring to paper | | | | | | | | | | | | |

(*1) Equivalent ratio of epoxy group/carboxyl group

TABLE 2

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Polymerization method | A | A | A | A | A | A | A | Solution polymerization | Solution polymerization | A | |
| Copolymer Copolymer composition (parts) | | | | | | | | | | | |
| 2-EHA | 88 | 88 | — | — | — | — | 58 | 74 | — | — | ⎫ |
| INO | — | — | 81 | 81 | 81 | 70 | — | — | 81 | 81 | ⎪ |
| MMA | 10 | 10 | — | — | — | — | 40 | 25 | — | — | Acrylic |
| AN | — | — | 17 | 17 | 18.95 | 15 | — | — | 17 | 17 | rubber |
| AC | 2 | 2 | — | — | — | — | 2 | 1 | — | — | solution |
| MAC | — | — | 2 | 2 | 0.05 | 15 | — | — | 2 | 2 | ⎪ |
| GAFAC RM-410 | — | — | — | — | — | — | — | — | — | — | ⎭ |
| Copolymer's glass transition temp. (°C.) | −58 | −58 | −62 | −62 | −62 | −44 | −22 | −43 | −62 | −62 | |
| Polyglycidyl compound (*1) | | | | | | | | | | | |
| GMA | — | — | — | — | — | — | — | — | — | 1.0 (*2) | — |

TABLE 2-continued

| | | | | | | | | | | | |
|---|---|---|---|---|---|---|---|---|---|---|---|
| PEGDGE | 1.0 | 1.0 | — | — | — | — | — | 1.0 | 1.0 | — | 1.0 |
| GDGE | — | — | 0.05 | 5.0 | — | — | 1.0 | — | — | — | — |
| TG-m-XD | — | — | — | — | 1.0 | 1.0 | — | — | — | — | — |
| Phosphoric acid ester (parts) | | | | | | | | | | | |
| GAFAC RM-410 | 0.05 | 20.0 | — | — | — | — | — | — | — | 2.0 | 2.0 |
| GAFAC RS-710 | — | — | 2.0 | 2.0 | — | — | 2.0 | — | — | — | — |
| JAS-101 | — | — | — | — | 2.0 | 2.0 | — | 2.0 | 2.0 | — | — |
| Adhesion (g/25 mm) (× 10²) | | | | | | | | | | | |
| *After 20° C. × 24 hours* | | | | | | | | | | | |
| Stainless steel plate | 8 | 8 | 15 | 2 | 17 | 18 | 16 | 15 | 14 | 15 | 10 |
| ABS plate | 10 | 10 | 17 | 3 | 16 | 15 | 19 | 17 | 13 | 17 | 12 |
| Polypropylene plate | 2 | 9 | 16 | 1 | 12 | 17 | 17 | 10 | 5 | 7 | 3 |
| *After 40° C. × 7 days* | | | | | | | | | | | |
| Stainless steel plate | 18 | 7 | 16 | 3 | 18 | 18 | 17 | 20 | 20 | 20 | 11 |
| ABS plate | 17 | 6 | 17 | 3 | 17 | 16 | 18 | 20 | 20 | 20 | 13 |
| Polypropylene plate | 4 | 5 | 15 | 1 | 12 | 17 | 17 | 12 | 7 | 7 | 3 |
| Peelability | | | | | | | | | | | |
| *After 20° C. × 24 hours* | | | | | | | | | | | |
| Stainless steel plate | A | A | D | E | D | C | C | C | E | C | E |
| ABS plate | A | A | D | E | D | C | C | C | E | C | E |
| Polypropylene plate | A | A | D | E | A | C | D | C | E | E | A |
| *After 40° C. × 7 days* | | | | | | | | | | | |
| Stainless steel plate | C | D,E | D | E | D | C | C | C | E | C | E |
| ABS plate | C | D,E | D | E | D | C | C | C | E | C | E |
| Polypropylene plate | E | E | D | E | A | C | D | E | E | E | Lifting |
| Tack (Ball No.) | 12 | 10 | 12 | 9 | 11 | 10 | 8 | 11 | 11 | 12 | 12 |
| Anchoring to paper | | | | X | | | | | | | |

| | Comparative Example | | |
|---|---|---|---|
| | 12 | 13 | 14 |
| Polymerization method | A | A | A |
| Copolymer composition (parts) | | | |
| 2-EHA | 88 | 88 | 88 |
| INO | — | — | — |
| MMA | 10 | 10 | 10 |
| AN | — | — | — |
| AC | 2 | 2 | 2 |
| MAC | — | — | — |
| GAFAC RM-410 | — | — | — |
| Copolymer's glass transition temp. (°C.) | −58 | −58 | −58 |
| Polyglycidyl compound (*1) | | | |
| GMA | — | — | — |
| PEGDGE | — | — | 1.0 |
| GDGE | — | — | — |
| TG-m-XD | — | — | — |
| Phosphoric acid ester (parts) | | | |
| GAFAC RM-410 | — | 2.0 | — |
| GAFAC RS-710 | — | — | — |
| JAS-101 | — | — | — |
| Adhesion (g/25 mm) (× 10²) | | | |
| *After 20° C. × 24 hours* | | | |
| Stainless steel plate | 18 | 18 | 8 |
| ABS plate | 20 | 20 | 10 |
| Polypropylene plate | 19 | 19 | 2 |
| *After 40° C. × 7 days* | | | |
| Stainless steel plate | 18 | 18 | 18 |
| ABS plate | 20 | 20 | 19 |
| Polypropylene plate | 20 | 20 | 4 |
| Peelability | | | |
| *After 20° C. × 24 hours* | | | |
| Stainless steel plate | D | D | A |
| ABS plate | D | D | A |
| Polypropylene plate | D | D | A |
| *After 40° C. × 7 days* | | | |
| Stainless steel plate | D | D | C |
| ABS plate | D | D | C |
| Polypropylene plate | D | D | Lifting |
| Tack (Ball No.) | 14 | 14 | 12 |
| Anchoring to paper | | | |

(*1) Equivalent ratio of epoxy group/carboxyl group
(*2) A monoglycidyl compound was used in place of the polyglycidyl compound.

The following matters are understood from Table 1 and Table 2.

In Examples 1-12, all the aqueous pressure-sensitive adhesives were superior in adhesion to adherend, peelability from adherend and adhesion to substrate. In Example 10, the monomer mixture was dispersed and emulsified with a phosphoric acid ester compound and then subjected to emulsion polymerization.

In Comparative Examples 1 and 2, the amount of phosphoric acid ester compound used was outside the range specified by this invention. When the amount was less than the lower limit, paper-breaking occurred owing to the increase of adhesion with time (Comparative Example 1). When the amount was more than the upper limit, adhesive-remaining on adherend or blur on adherend occurred (Comparative Example 2).

In Comparative Examples 3 and 4, the amount of polyglycidyl compound used was outside the range specified by this invention. When the amount was less than the lower limit, adhesive-remaining or adherend occurred owing to too strong adhesion (Comparative Example 3). When the amount was more than the upper limit, blur on adherend occurred and anchoring to paper was poor (Comparative Example 4).

In Comparative Examples 5 and 6, the amount of an α,β-unsaturated carboxylic acid used as a monomer component was outside the range specified in this invention. There occurred adhesive-remaining on adherend or paper-breaking due to too strong adhesion.

In Comparative Example 7, the amount of 2-ethylhexyl acrylate used as a monomer component was outside the range specified in this invention, and paper-breaking occurred owing to too strong adhesion.

In Comparative Examples 8 and 9, a solution consisting of 100 parts of a monomer mixture, 75 parts of toluene, 75 parts of ethyl acetate and 0.5 part of benzoyl peroxide was stirred at 70° C. for 10 hours in a nitrogen gas atmosphere to obtain a polymer solution of a polymerization conversion of 100%. A polyglycidyl compound and a phosphoric acid ester compound were added to the polymer solution to prepare a pressure-sensitive adhesive. The adhesive was coated on a peeling paper, dried and transferred onto a high-quality paper. Then, the high-quality paper was subjected to the same test sample preparation and subsequent evaluation as in Examples 1-12. In Comparative Examples 8 and 9, solution polymerization was employed in place of the emulsion polymerization and the resulting polymer solution was used in the preparation of a pressure-sensitive adhesive. This adhesive caused blur on adherend as well as paper-breaking due to the increase of adhesion with time.

In Comparative Example 10, a glycidyl compound having one epoxy group was used in place of the polyglycidyl compound, and adhesive-remaining on adherend occurred owing to too strong adhesion.

COMPARATIVE EXAMPLE 11

In this Comparative Example, a solution-type pressure-sensitive adhesive composition obtained by dissolving an acrylic rubber as a solid polymer in an organic solvent was blended with a phosphoric acid ester compound and a polyglycidyl compound.

100 parts of an acrylic acid rubber [Teisan Rubber No. 1000 (brand name of Teikoki Kagaku Sangyo K.K.)] was dissolved in toluene in a 20% concentration; a phosphoric acid ester compound and a polyglycidyl compound was added thereto to prepare a pressure-sensitive adhesive; the adhesive was formed into a test piece in the same manner as in Comparative Examples 8 and 9; and the test piece was evaluated in the same manner as in Examples 1-12. The results are shown in Table 2. The pressure-sensitive adhesive prepared above was satisfactory in adhesion to and peelability from stainless steel plate and ABS plate, but it had poor (weak) adhesion to polypropylene plate. Particularly, when 7 days elapsed at 40° C. from the sticking of test piece on polypropylene plate, lifting of test piece appeared because the adhesion of adhesive to polypropylene plate could not withstand the shrinkage of paper (substrate). Further, the pressure-sensitive adhesive of this Comparative Example caused blur on adherend after the test piece had been peeled from a stainless steel plate or an ABS plate.

COMPARATIVE EXAMPLE 12

An aqueous pressure-sensitive adhesive was prepared by emulsion polymerization using the monomer components shown in Table 2. Adhesion, peelability, tack and anchoring to paper of the aqueous pressure-sensitive adhesive alone are shown in Table 2. The adhesion to adherend was too strong and the adhesive remained on the adherend.

COMPARATIVE EXAMPLE 13

An aqueous pressure-senstive adhesive was prepared by emulsion polymerization using the monomer components shown in Table 2, and then mixed with only a phosphoric ester. The adhesion to adherend was too strong, and the adhesive remained on the adherend.

COMPARATIVE EXAMPLE 14

An aqueous pressure-sensitive adhesive was prepared by emulsion polymerization using the monomer components shown in Table 2, and mixed with only a polyglycidyl compound. When 7 days elapsed at 40° C. from the sticking of test piece on the ABS plate, the adhesion increased and the peelability became bad. The adhesion to polypropylene plate was weak. Particularly, when 7 days elapsed at 40° C. from the sticking of test piece on the adherend, the adhesion of the adhesive could not withstand the shrinkage of paper and hence lifting of test piece appeared. Further, blur was found on the adherend after the peeling of test piece.

What is claimed is:

1. An aqueous pressure-sensitive adhesive consisting essentially of (1) 100 parts by weight (in terms of solids content) of an aqueous copolymer emulsion obtained by emulsion-polymerizing a monomer mixture consisting of 70-99.9% by weight of at least one alkyl (meth)acrylate in which the alkyl group has 4-12 carbon atoms, 0.1-10% by weight of an α,β-unsaturated carboxylic acid and 0-29.9% by weight of a monomer copolymerizable therewith, said copolymer being of a glass transition temperature (Tg) of −40° C. or less, and said aqueous copolymer emulsion being neutralized with ammonia, (2) 0.1-10 parts by weight of an alkali metal salt of phosphoric acid ester, and (3) a polyglycidyl compound in such an amount that the proportion of the epoxy group in the polyglycidyl compound is 0.1-3 equivalents per equivalent of the carboxyl group in the aqueous copolymer.

2. The aqueous pressure-sensitive adhesive according to claim 1, wherein the alkyl (meth)acrylate is selected from the group consisting of butyl acrylate, 2-ethylhexyl acrylate, n-octyl acrylate, isononyl acrylate, lauryl acrylate, butyl methacrylate, 2-ethylhexyl methacrylate, n-octyl methacrylate, isononyl methacrylate and lauryl methacrylate.

3. The aqueous pressure-sensitive adhesive according to claim 1, wherein the at least one alkyl (meth)acrylate is selected from the group consisting of butyl acrylate, 2-ethylhexyl acrylate, isononyl acrylate and lauryl methacrylate.

4. The aqueous pressure-sensitive adhesive according to claim 1, wherein the proportion of the at least one alkyl (meth)acrylate is 75-98% by weight based on the total weight of the monomer mixture.

5. The aqueous pressure-sensitive adhesive according to claim 1, wherein the $\alpha,\beta$-unsaturated carboxylic acid is at least one member selected from the group consisting of acrylic acid, methacrylic acid, itaconic acid, maleic acid and fumaric acid.

6. The aqueous pressure-sensitive adhesive according to claim 1, wherein the $\alpha,\beta$-unsaturated carboxylic acid is acrylic acid or methacrylic acid or a mixture of the two.

7. The aqueous pressure-sensitive adhesive according to claim 4, wherein the proportion of the $\alpha,\beta$-unsaturated carboxylic acid is 0.3-5% by weight based on the total weight of the monomer mixture.

8. The aqueous pressure-sensitive adhesive according to claim 1, wherein the phosphoric acid ester compound is a phosphoric acid ester, an alkyl type phosphoric acid ester, an alkylphenol type phosphoric acid ester or a salt of a diester of phosphoric acid with a higher alcohol.

9. The aqueous pressure-sensitive adhesive according to claim 1, wherein the amount of the phosphoric acid ester compound is 0.2-5 parts by weight per 100 parts by weight of the copolymer emulsion.

10. The aqueous pressure-sensitive adhesive according to claim 1, wherein the polyglycidyl compound is ethylene glycol diglycidyl ether, polyethylene glycol diglycidyl ether, propylene glycol diglycidyl ether, polypropylene glycol diglycidyl ether, neopentyl glycol diglycidyl ether, 1,6-hexanediol diglycidyl ether, dibromoneopentyl glycol diglycidyl ether, diglycidyl o-phthalate, glycerine polyglycidyl ether, trimethylolpropane polyglycidyl ether, diglycerol polyglycidyl ether, polyglycerol polyglycidyl ether, sorbitol polyglycidyl ether, N,N,N',N'-tetraglycidyl-m-xylylenediamine, N,N,N',N',N''-pentaglycidylethylenetriamine or N,N,N,'N,'-tetraglycidylethylenediamine.

11. The aqueous pressure-sensitive adhesive according to claim 1, wherein the polyglycidyl compound is polyethylene glycol diglycidyl ether or N,N,N',N'-tetraglycidyl-m-xylylenediamine.

12. The aqueous pressure-sensitive adhesive according to claim 1, wherein the amount of the polyglycidyl compound is such that the proportion of the epoxy group in the polyglycidyl compound is 0.2-2 equivalents per equivalent of the carboxyl group in the copolymer.

13. .The aqueous pressure-sensitive adhesive according to claim 1, which further comprises a white pigment, a thickener, a wetting agent, an alkali, a stabilizer and an emulsifier.

* * * * *